United States Patent
Peace et al.

(10) Patent No.: US 10,072,583 B2
(45) Date of Patent: Sep. 11, 2018

(54) MOUNTING BRACKET

(71) Applicant: ROLLS-ROYCE PLC, London (GB)

(72) Inventors: Richard Peace, Derby (GB); Rong Yang, Derby (GB); Joshua Lee, Derby (GB); Liam Kelly, Nottingham (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 15/622,419

(22) Filed: Jun. 14, 2017

(65) Prior Publication Data
US 2018/0010524 A1  Jan. 11, 2018

(30) Foreign Application Priority Data
Jul. 7, 2016 (GB) .................................. 1611801.0

(51) Int. Cl.
*A47B 96/06* (2006.01)
*F02C 7/32* (2006.01)
*F01D 25/24* (2006.01)
*F01D 25/28* (2006.01)

(52) U.S. Cl.
CPC .............. *F02C 7/32* (2013.01); *F01D 25/24* (2013.01); *F01D 25/28* (2013.01); *F05D 2220/32* (2013.01); *F05D 2230/30* (2013.01); *F05D 2250/75* (2013.01); *H05K 999/99* (2013.01); *Y02T 50/671* (2013.01)

(58) Field of Classification Search
CPC ........ F02C 7/32; F01C 25/24; F05C 2220/32; F05C 2250/75; F01D 25/24; F01D 25/28; F05D 2220/32; F05D 2250/75; F05D 2230/30; Y02T 50/671; H05K 999/99
USPC ................................................ 248/205.1, 554
See application file for complete search history.

(56) References Cited

U.S. PATENT DOCUMENTS

| 5,439,189 A | 8/1995 | Wiley et al. |
| 2011/0002782 A1 | 1/2011 | Boucher et al. |
| 2012/0110821 A1 | 5/2012 | Callaghan |
| 2016/0169046 A1* | 6/2016 | Acius .................... F01D 25/243 415/200 |

FOREIGN PATENT DOCUMENTS

| EP | 2012060 A1 | 1/2009 |
| WO | 2015/065525 A1 | 5/2015 |

OTHER PUBLICATIONS

Jan. 5, 2017 Search Report issued in British Patent Application No. 1611801.0.
Nov. 15, 2017 Search Report issued in European Patent Application No. 17175986.

* cited by examiner

Primary Examiner — Christopher Garft
(74) Attorney, Agent, or Firm — Oliff PLC

(57) ABSTRACT

A mounting bracket for mounting an accessory to a gas turbine engine, the mounting bracket including a space frame structure. The space frame structure including a plurality of struts joined to one another at nodes.

11 Claims, 5 Drawing Sheets

MOUNTING BRACKET

The present disclosure concerns a bracket for mounting accessories to a casing or nacelle of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A fan casing 23 surrounds the propulsive fan 13, and a core casing 24 surrounds the compressors 14, 15, the combustion equipment 16 and the turbines 17, 18 and 19. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by a suitable interconnecting shaft.

Commonly, accessories and ancillary devices are attached to the fan casing 23 or core casing 24 of the engine. Examples of such accessories and ancillary devices are actuators, controllers, sensors and solenoid valves such as the modulating air shut-off valve or MASV. The accessories or ancillary devices are typically mounted to the casing by brackets, which conventionally are fabricated from metal sheet. These brackets are relatively heavy and there are typically tens of brackets on an engine, representing a considerable total weight. The design geometry of these conventional brackets is also limited by the methods of manufacture; for example there may be limits on achievable material thickness or bend radius. Conventional brackets may therefore have to be of sub-optimal design. These factors have a detrimental effect on the performance and fuel efficiency of the engine and thus of the aircraft it powers. Furthermore, the manufacture of conventional brackets is lengthy and labour-intensive because of the methods used and the relatively large number of parts in each bracket.

It would therefore be desirable to have a bracket that could provide the necessary strength and stiffness at a lighter weight, and with a lower life cycle cost and a quick method of manufacture.

According to a first aspect there is provided a mounting bracket for mounting an accessory to a gas turbine engine, the bracket comprising a space frame structure, the space frame structure comprising a plurality of struts joined to one another at nodes.

The space frame construction minimises the weight of the bracket for a given strength and stiffness.

The space frame structure may comprise a double layer grid comprising a first layer and a second layer.

Such a construction increases the strength and stiffness of the bracket by increasing its through-thickness dimension, while the space frame construction minimises the weight penalty of the additional struts.

At least one node may be extended to form a pillar that acts as a node for both the first layer and the second layer.

By connecting the first layer and the second layer in this way, the strength and stiffness of the bracket is increased with only a minimal weight penalty.

The first layer and the second layer may converge towards a periphery of the bracket, so that at least one node at the periphery acts as a node for both the first layer and the second layer.

At least one strut in the first layer is linked by a brace to a corresponding strut in the second layer.

The brace links the two struts to form an I-beam structure. This increases the strength and stiffness of the bracket without greatly increasing its weight.

At least one of the struts may be curved.

At least one node may be extended to form an attachment boss.

A first plurality of extended nodes may form a first set of attachment bosses for attaching an accessory to the bracket.

A second plurality of extended nodes may form a second set of bosses for attaching the bracket to a casing or nacelle of a gas turbine engine.

The first set of bosses may lie substantially in a first plane and the second set of bosses may lie substantially in a second plane, and the first and second planes may be substantially parallel. Alternatively, the first and second planes may be substantially perpendicular.

Other gas turbine engines to which the present disclosure may be applied may have alternative configurations. By way of example such engines may have a different number of interconnecting shafts (e.g. two) and/or a different number of compressors and/or turbines. Furthermore, the engine may comprise a gearbox provided in the drive train from a turbine to a compressor and/or fan.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

Embodiments will now be described, by way of example only, with reference to the Figures, in which.

Figure 1:
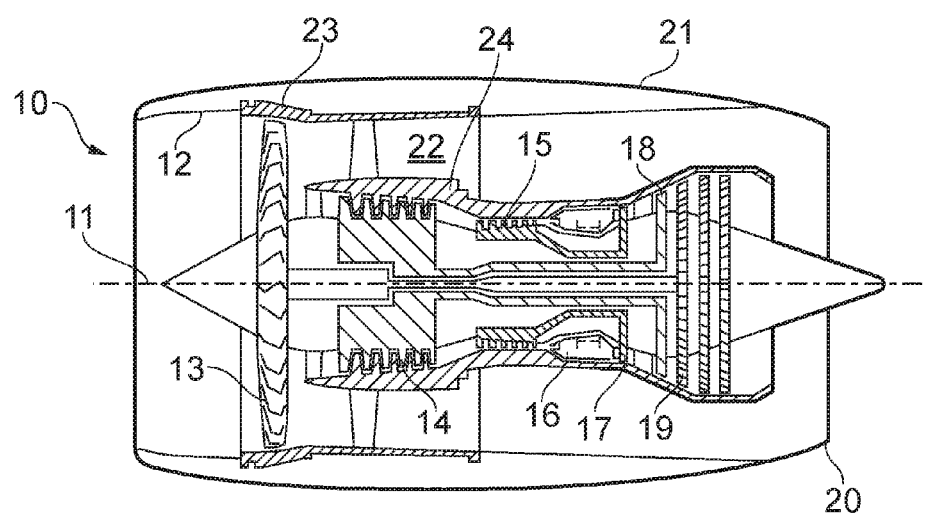
FIG. 1 is a sectional side view of a gas turbine engine, as already described.
Figure 2:
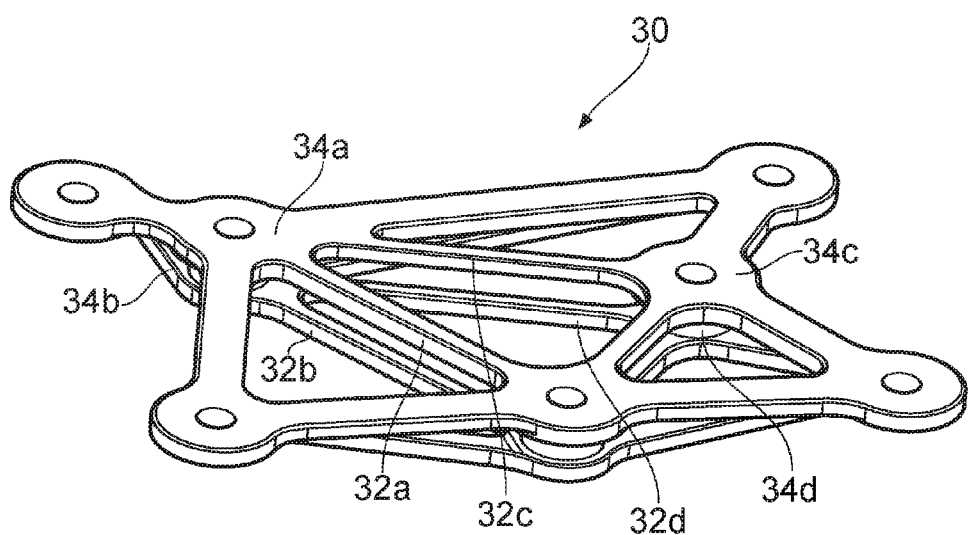
FIG. 2 is a perspective view of a first embodiment of a bracket.

FIG. 2 shows a bracket 30. The bracket comprises a space frame structure. The space frame structure comprises struts 32 (for example 32a, 32b, 32c, 32d) which are joined to other struts at nodes 34 (for example 34a, 34b).

The space frame structure comprises a double layer grid, so struts 32a, 32c and nodes 34a, 34c are part of a first layer and struts 32b, 32d and nodes 34b, 34d are part of a second layer. Struts 32a, 32b and 32c, 32d occupy corresponding positions in the first and second layers, as similarly do nodes 34a, 34b and 34c, 34d. This structure provides a bracket with a greater dimension in its through-thickness direction, which enhances its strength and stiffness compared with a single-layer bracket; but the space frame construction minimises the weight of the bracket.

Figure 3:
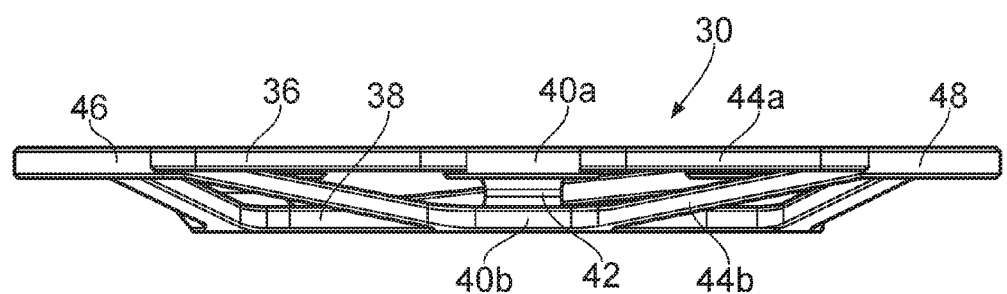
FIG. 3 is a side view of the bracket of FIG. 2.

FIG. 3 shows a side view of the bracket 30 of FIG. 2, in which the first layer 36 and the second layer 38 are more clearly visible. Node 40a, which is in the first layer, and node 40b, which is in the second layer, are extended so they join to form a pillar 42 which links the first and second layers. This linking of the layers of the space frame structure provides greater stiffness with a minimal weight penalty. The two layer construction increases the stiffness of the bracket by adding additional bracing below the mounting points. It also allows the tuning of the bracket so that the vibration performance may be matched to the engine environment at minimal weight penalty.

Towards the periphery of the bracket 30, the first layer 36 and the second layer 38 converge, as seen in the struts 44a, 44b. Consequently, at the periphery of the bracket the first layer and second layer are coincident, and the nodes 46, 48 at these positions act as nodes both for the first layer and for the second layer.

Figure 4:
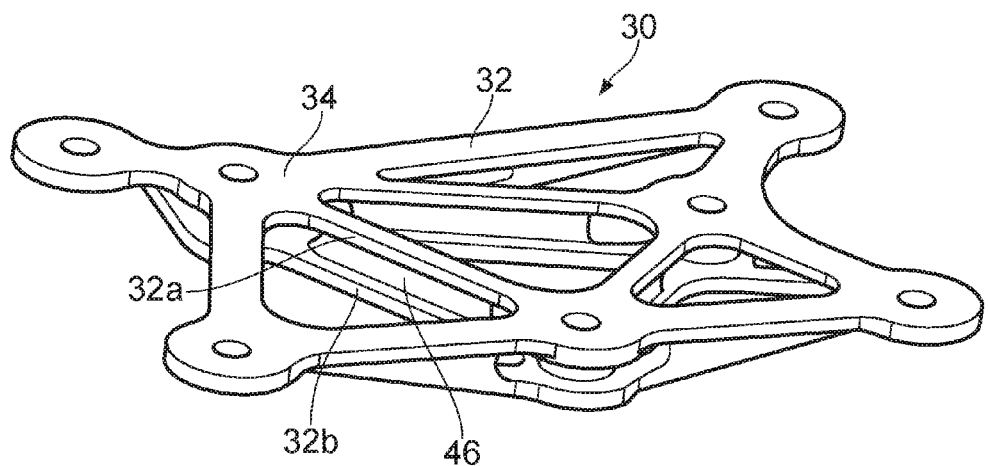
FIG. 4 is a perspective view of a second embodiment of a bracket.

FIG. 4 shows a perspective view of a second embodiment of a bracket. Some features of FIG. 4 are identical to features of FIG. 2, and for these the same reference numbers have been used.

The bracket 30 comprises struts 32, which are joined at nodes 34. In this embodiment, struts 32a and 32b are linked by a brace 46 so that the combination of struts 32a, 32b and brace 46 forms an I-beam structure. The bracing of the struts provides a bracket with greater strength and stiffness, although there is of course an increase in weight. In other embodiments, the two struts may be linked by braces of other forms or constructions. However, the I-beam is particularly suitable as it has the stiffest cross-section in bending.

Figure 5:
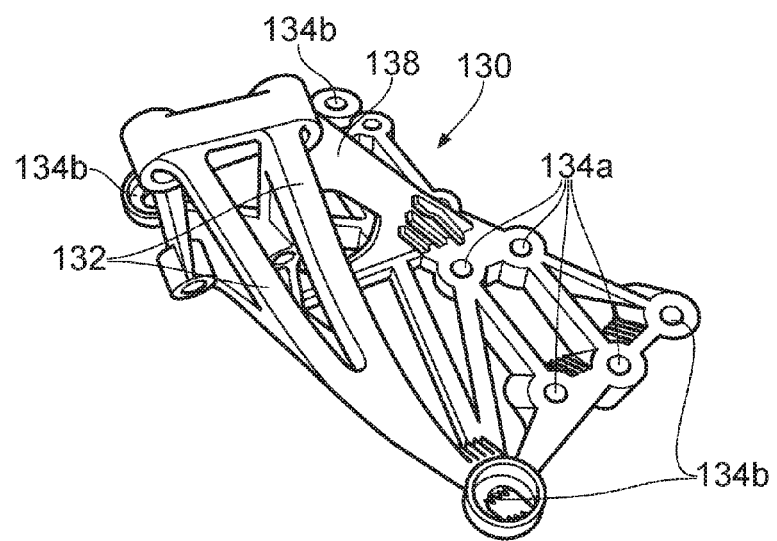
FIG. 5 is a perspective view of a third embodiment of a bracket.

FIG. 5 shows a perspective view of a third embodiment of a bracket. As in the previous embodiments the bracket 130 comprises a space frame structure of struts joined at nodes. In contrast to the previous embodiments, the bracket 130 is not formed as a double layer grid, but has a generally L-shaped geometry. Also in contrast to the previous embodiments, some of the struts in bracket 130 are curved, for example struts 132. Curved struts allow additional stiffness while being very space-efficient, thereby minimising the footprint of the bracket. Also, curved struts allow more flexibility than straight struts under thermal expansion.

A first plurality of nodes 134a is configured to form attachment bosses by which an accessory may be attached to the bracket, by extending the radius and depth of each of the nodes. The attachment method will vary depending on a number of factors including available space and clearance; the attachment method may for example be by bolt and nut, or by bolt and threaded insert in the bracket.

Adjacent to the nodes 134a is a feature 136 comprising three linear stiffening features (visible as "stripes" in FIG. 5). The combination of the curved struts 132 with the stiffening features of 136 allows tooling access to the bolts attaching the accessory to the bracket via the nodes 134a. In the absence of this feature 136, the sail feature 138 would have to be recessed back, which would compromise the overall stiffness of the structure.

A second plurality of nodes 134b is similarly configured to form attachment bosses by which the bracket may be attached to a casing of a gas turbine engine. Some of the nodes 134b may be configured by being thicker than others, or by other features such as recesses or projections, depending on the particular mechanical and geometric requirements of the installation.

Figure 6:
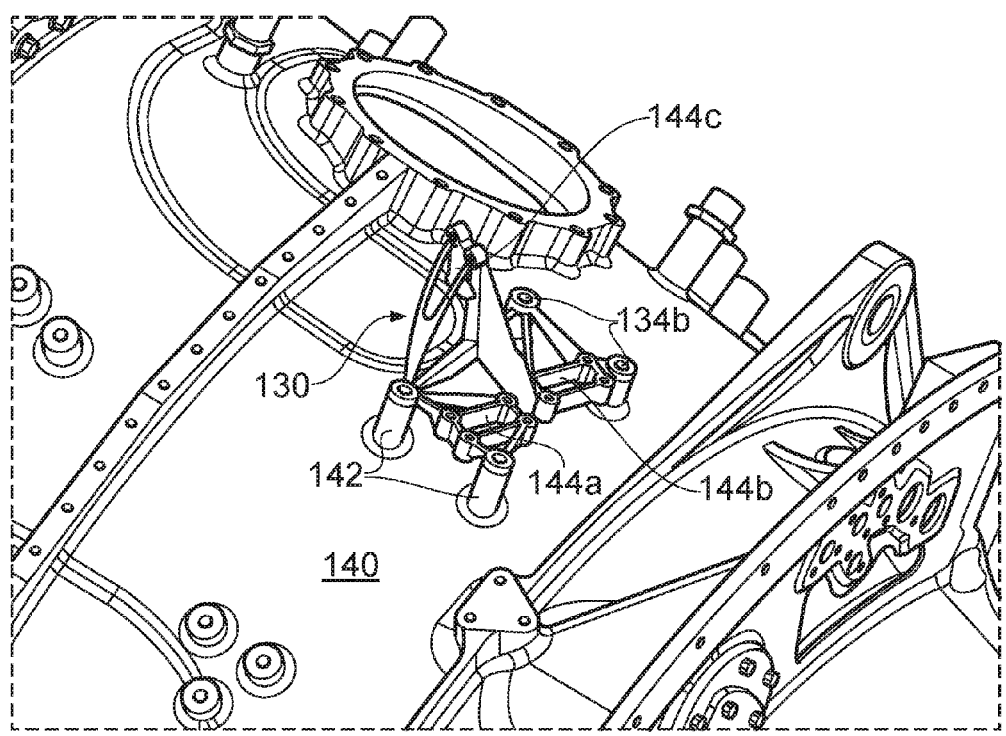
FIG. 6 is a perspective view of the bracket of FIG. 5 mounted to a casing of a gas turbine engine.

FIG. 6 shows the bracket 130 of FIG. 5 mounted on a casing 140 of a gas turbine engine. Bosses 142 attached to, or integrally formed with, the casing 140 extend radially outward from the casing so that the bracket 130 may engage with them and be secured to them. In this embodiment the bracket 130 is secured to the bosses 142 by bolts engaging with threads in the bosses. The bracket 130 is capable of carrying three engine accessories, on three sets of attachment bosses 144a (consisting of the nodes 134a described above), 144b and 144c. Each set of attachment bosses 144a, 144b, 144c consists of four bosses. In this embodiment, the positioning of the sets 144a, 144b, 144c of attachment bosses has been selected to minimise the footprint of the bracket on the casing while still permitting tool and hand access to the accessories.

Figure 7:
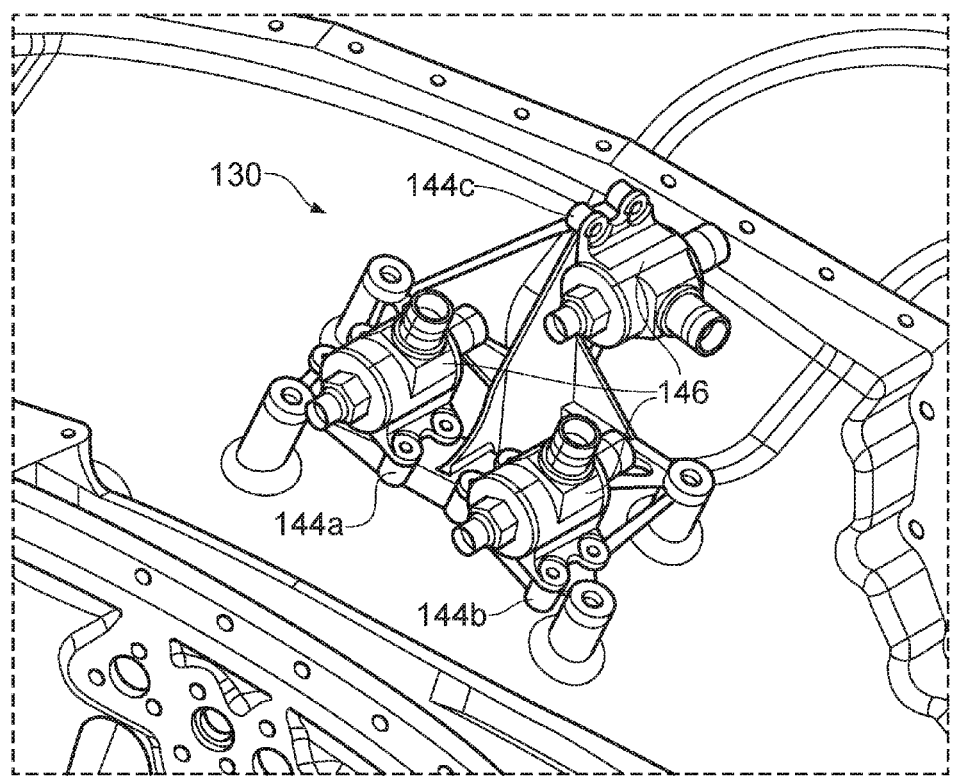
FIG. 7 is a perspective view of the bracket of FIG. 6, with three engine accessories mounted on it.

FIG. 7 shows the bracket 130 of FIG. 6 mounted on a casing of a gas turbine engine, and with three sensors 146 mounted on it. In this embodiment the sensors 146 are pressure transducers. Each sensor is mounted to one of the sets 144a, 144b, 144c (previously described) of four attachment bosses.

It is envisaged that a bracket such as those described will advantageously be made using an additive manufacture technique, such as electron beam melting (EBM) or direct laser deposition (DLD). Such a manufacturing technique allows the construction of a bracket with optimised vibration and stress performance at minimal weight. Additive manufacturing techniques also allow the manufacture of complex shapes that may not be feasible with conventional machining techniques because of problems with tool access or because of the complexity or cost of the machining required.

The brackets may be made from any suitable material. It is envisaged that they would normally be made from a metallic material, for example nickel-based alloy or titanium, but other materials—metallic or non-metallic—may be used where suitable for the operating conditions.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A mounting bracket for mounting an accessory to a gas turbine engine, the bracket comprising:
 a space frame structure that includes a first layer and a second layer, the first layer including a plurality of first struts and the second layer including a plurality of second struts, and the first layer being parallel to the second layer;
 a plurality of nodes that each joins together two or more struts of the plurality of first struts and the plurality of second struts; and
 a third strut that is obliquely disposed with regard to both the first layer and the second layer such that the third strut extends from the first layer to the second layer to directly connect the first layer with the second layer.

2. The mounting bracket of claim 1, wherein the first layer and the second layer of the space frame structure form a double layer grid.

3. The mounting bracket of claim 2, wherein at least one node of the plurality of nodes is extended to form a pillar that forms a node for both the first layer and the second layer.

4. The mounting bracket of claim 2, wherein the third node is disposed at a periphery of the mounting bracket.

5. The mounting bracket of claim 2, wherein at least one of the plurality of first struts is linked by a brace to a corresponding one of the plurality of second struts.

6. The mounting bracket of claim 1, wherein the space frame structure forms an L shape.

7. The mounting bracket of claim 1, wherein at least one of the struts is curved.

8. The mounting bracket of claim 1, wherein at least one node of the plurality of nodes is configured to form an attachment boss.

9. The mounting bracket of claim 8, wherein a first plurality of extended nodes forms a first set of attachment bosses for attaching an accessory to the bracket.

10. The mounting bracket of claim 9, wherein a second plurality of extended nodes forms a second set of attachment bosses for attaching the bracket to a casing or nacelle of a gas turbine engine.

11. The mounting bracket of claim 10, wherein the first set of bosses lies substantially in a first plane and the second set of bosses lies substantially in a second plane, and the first and second planes are substantially perpendicular.

\* \* \* \* \*